Dec. 24, 1968  H. BARRAS  3,417,495
TERRACING, GRADING AND LEVELING DEVICE
Filed Dec. 6, 1965  4 Sheets-Sheet 4

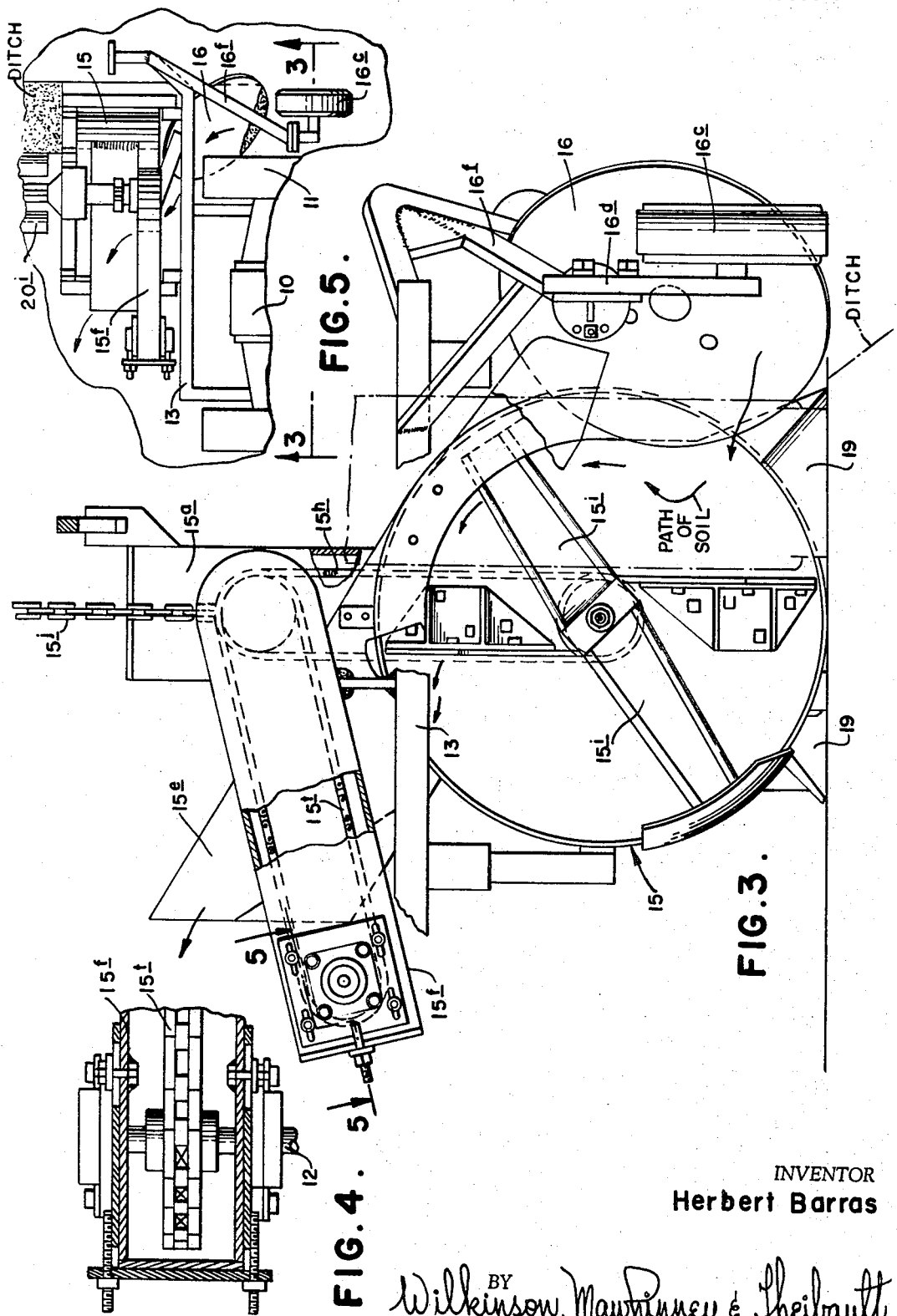

INVENTOR
Herbert Barras
BY Wilkinson, Mawhinney & Theibault
ATTORNEYS

United States Patent Office 3,417,495
Patented Dec. 24, 1968

3,417,495
TERRACING, GRADING AND LEVELING DEVICE
Herbert Barras, P.O. Box 327,
Baldwin, La. 70514
Filed Dec. 6, 1965, Ser. No. 511,826
3 Claims. (Cl. 37—93)

ABSTRACT OF THE DISCLOSURE

The present invention is directed to a terracing and grading device for use with a tractor having a power take-off at the rear thereof adapted to be coupled to drive the terracing and grading device. This device is provided with a primary and secondary earth cutter of the rotary type which is adapted to be drawn at the rear of the tractor with the axis of the rotary cutter lying substantially along the axis of the left rear wheel of the tractor. A two frame unit is pivoted to the rear of the tractor, that is one frame pivoted to the other and the main frame pivoted to the tractor. Supported by one frame is a support for a plow disc which disc is arranged at an angle to overlap the left rear wheel of the tractor and the intake of the rotary earth cutter so that the tractor and terracing device may be used to work close to a ditch without tipping the tractor into the ditch. A winged plow cooperates with the rotary cutter and disc to form an earth path of smooth flow from the disc in advance of the winged plow into the rotating earth cutter and thence out of the discharge spout which directs the earth transversely over a very substantial distance at a uniform depth over the terrain.

---

The present invention relates to a terracing, grading and leveling device and has for an object to provide an apparatus for use with a tractor which has larger rear tractive propulsion wheels and a power take-off at its rear and which device eliminates the need for a grader, scoop and land leveler. The device of the present invention finds particular application in the terracing and grading of sugar cane fields and the squares which are bounded by drainage ditches, more particularly those shown in FIGURE 1 of U.S. Letters Patent No. 3,102,349 to B. C. Thomson. The device of the present invention eliminates the taking of multiple cuts, scooping and leevling transversely between the ditch bank rows and which device, when cutting right to left, will eliminate the possibility of the tractor falling into the drainage ditch because of the plow disc which cooperates with the rotary earth throwing disc cuts a path of transverse width more than the distance beyond the left rear wheel so that the tractor will at no time be exposed to falling into the ditch.

Heretofore in the prior art numerous ditching machines have been proposed but none of these machines have performed the functions of a grader, scoop and land leveler.

My prior patent, No. 2,737,734 as well as Patent No. 3,132,430 which related to a quarter drain ditch which involved the use of a rotary ditching member and earth deflecting scoop does not provide a device which will transversely contour the earth transversely to the direction of travel of the device to initially engage the earth with a plow type disc which disc will initially loosen the earth and deliver same to the rotary earth engaging member for scattering distribution beyond the area to be contoured.

A further object of the present invention is the provision of a terracing and grading device of the character described, including a winged plow means carried by a static portion of the rotary cutter which extends forward of the rotary cutter for scattering the earth in a uniform manner.

A still further object of the present invention is a provision of a device of the character described further comprising ground engaging control means behind the rotary cutter to regulate the depth of cut of the rotary cutter.

While the device of the present invention will be described as applicable to the terracing and grading of a sugar cane field, it will be readily apparent that the device of the present invention may be employed in the terracing of highways and other areas and is not limited to the use solely in a sugar cane field.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 3 is a front vertical section of the device of the present invention with parts broken away and parts shown in section.

FIGURE 4 is a fragmentary sectional view taken on the lines 5—5 in FIGURE 3.

FIGURE 5 is a fragmentary top plan view of the device of the present invention as applied to the rear of a tractor showing its transverse extension behind the rear tractor drive wheels.

Figure 1:
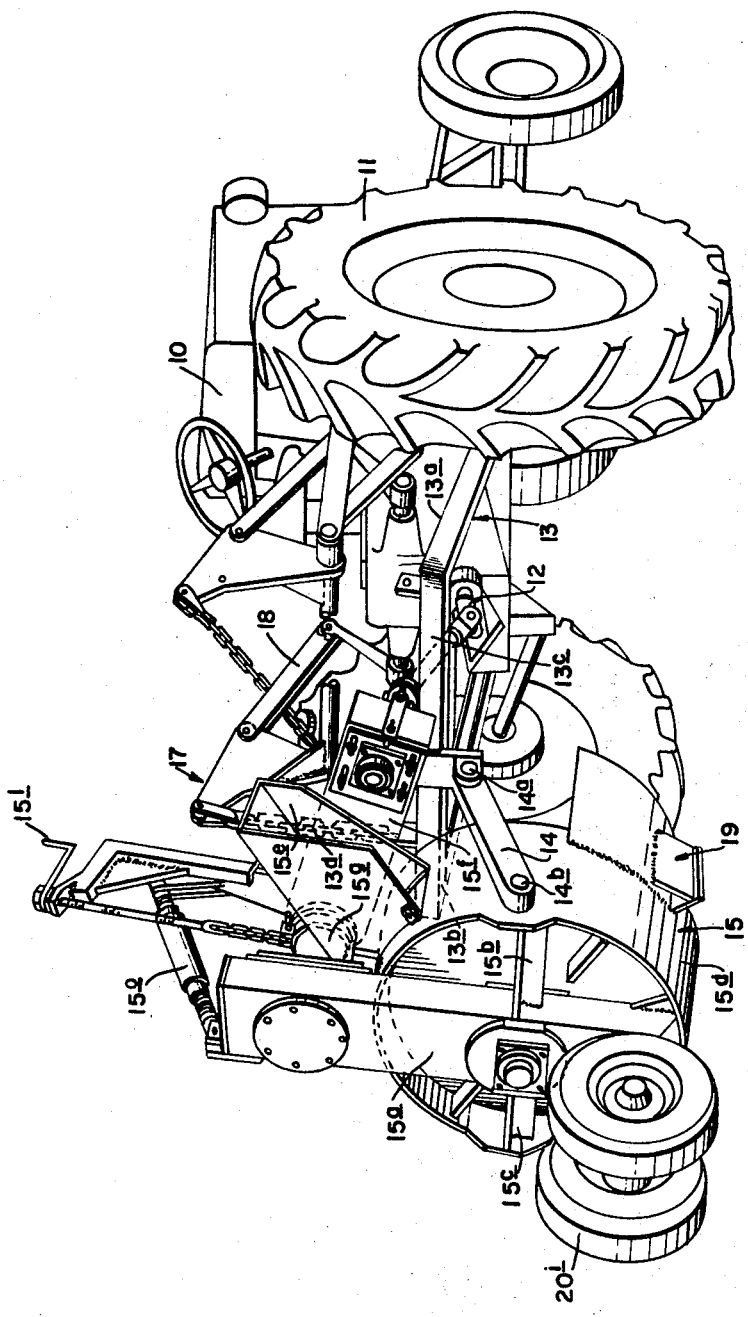
FIGURE 1 is a right rear perspective view of a tractor having the device of the present invention installed therein.
Figure 2:
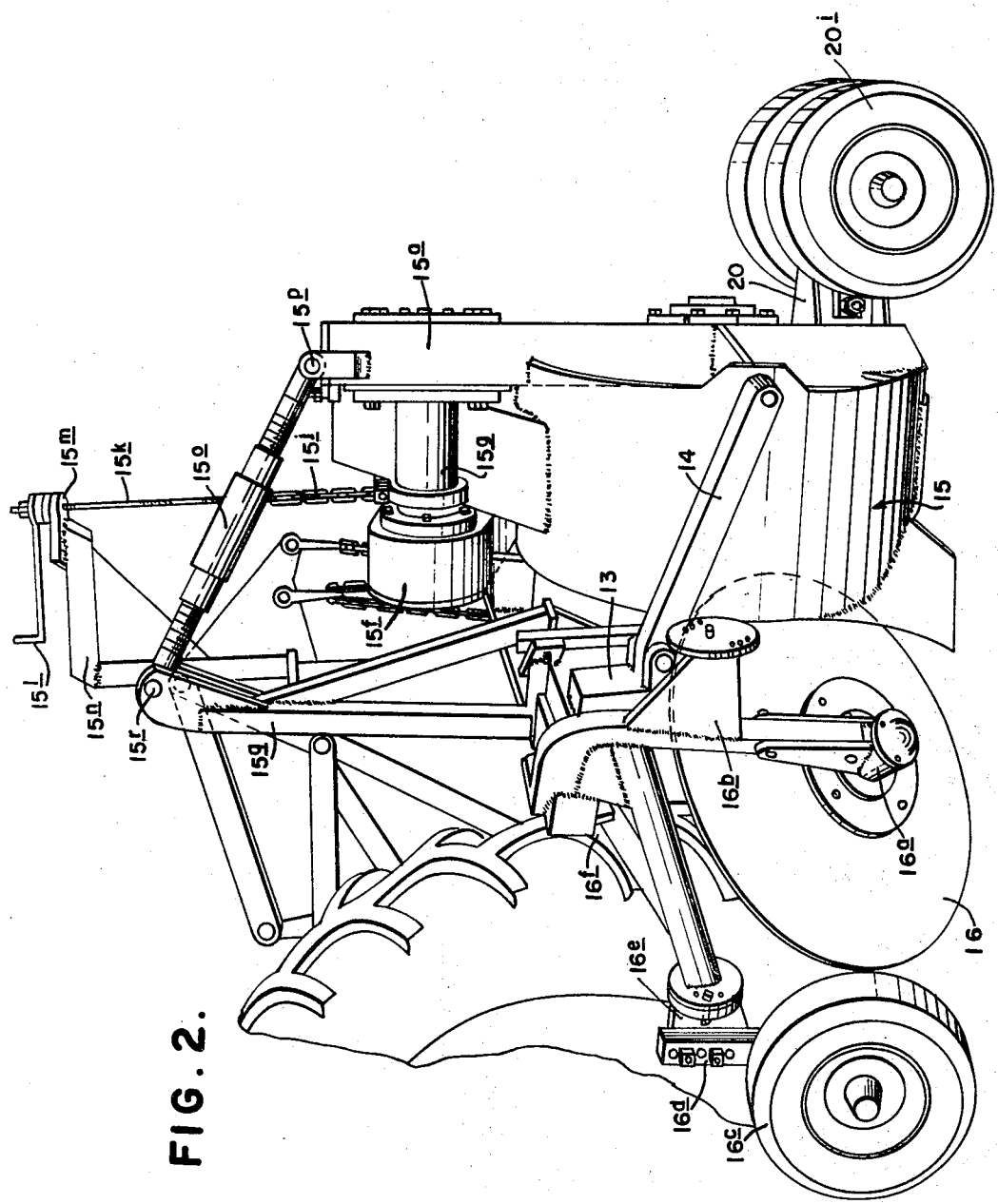
FIGURE 2 is a fragmentary left rear perspective view of the device of the present invention.

Referring more particularly to the drawings and for the moment to FIGURES 1 and 2, 10 designates generally a tractor having large rear traction wheels 11 and which tractor is supplied at its rear with a power take-off 12. Also pivotally secured to the rear of the tractor is a first frame 13 of generally U shape to which is pivotally connected a second frame 14. The second frame has pivotally connected thereto a rotary cutter 15 for engaging and moving earth in advance of which is a plow disc 16 connected to the first frame. The earth engaging and cutting members 15 are provided with a lowering mechanism 17 which is secured to a chain connection which is hydraulically connected to a set of hydraulically actuated links 18.

As set forth in the claims by elements, the description will best be understood by reading as follows:

THE FIRST FRAME

The first frame construction consists of a generally U-shaped frame 13 having legs 13ª and 13ᵇ joined by a transverse cross member 13ᶜ. The forward free ends of the members 13ª and 13ᵇ are pivotally connected to the tractor rear frame for vertical elevation (not shown). This elevation is attained through a chain 13d, one end of which is secured to the cross member 13c and the other end of which is connected to the plate 17 and through the link 18 to a hydraulic actuator (not shown but conventionally on the tractor) for raising and lowering the primary frame 13.

THE SECOND FRAME

Pivotally connected to and extended rearwardly of the first frame is a second frame 14 which is pivotally connected to the primary frame from a lug 14a extending from beneath the first frame member 13c. At its rear end, the second frame 14 is pivotally connected at 14b to the housing of the rotary earth engaging cutter 15.

THE ROTARY EARTH ENGAGING CUTTER

The rotary earth engaging cutter 15 has a vertical chain drive casement 15a at its rear and has connected thereto transverse support members 15b and 15c. This structure is provided with a circumferential shield 15d and an earth discharging spout 15e.

Figure 6:
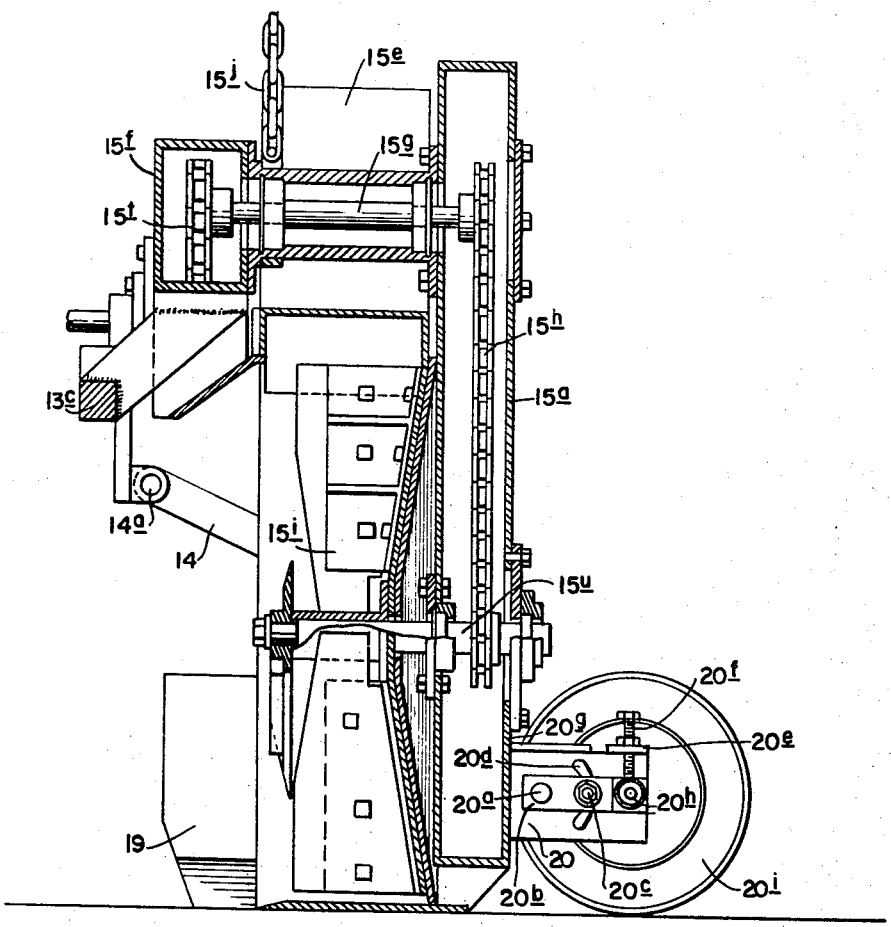
FIGURE 6 is a vertical section taken through the rotary cutter showing the rotary cutter and winged type plow means in advance thereof.
Figures 7, 8:
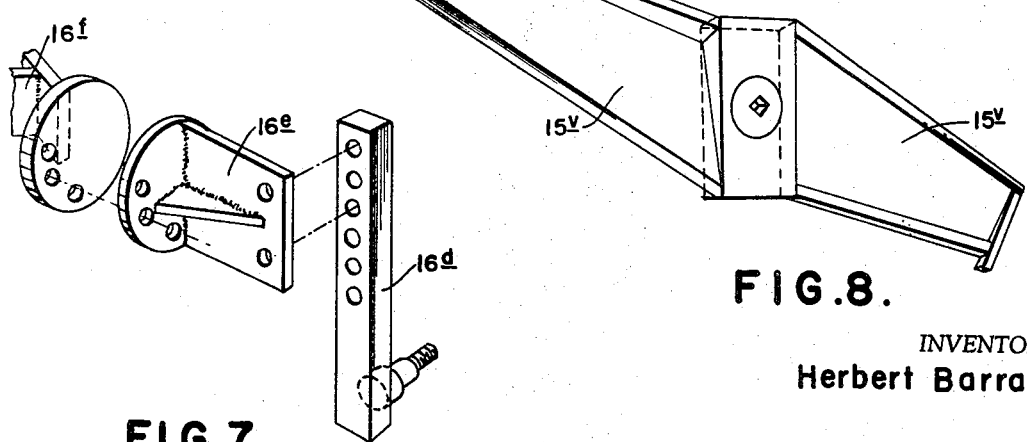
FIGURE 7 is a fragmentary perspective view showing the depth control setting means for the plow disc ground engaging means.
FIGURE 8 is a perspective view of one form of rotary cutter for scattering the earth supplied to the rotary cutter by the plow disc means.

The chain casement 15a for drivving the rotary earth engaging cutter 15 is connected to a transverse chain casement 15f which receives its primary power from the power take-off 12 of the tractor and connects the drive from the power take-off 12 (FIGURES 3 and 4) through the casement 15f through the shaft 15g through chain 15h taken to the rotary earth engaging cutter shaft 15u, thence to cutter 15i, as best seen in FIGURE 6.

PLOW DISC

Referring now to FIGURE 2, positioned in advance of the rotary cutter 15 is a rotary earth engaging disc 16 of the plow disc type which is rotatably journaled in a bearing assembly 16a carried by a standard 16b which is secured to the first frame 13 along its member 13c. The depth control of the plow disc and primary frame is under control of a set of wheels 16c carried on vertical supports 16d which are vertically regulatable by a frame coupling 16e which is in turn connected to the first frame 13 through a strut 16f.

ELEVATING CONTROL

The elevating control has two functions. It not only regulates the vertical height of adjustment of the first frame 13 through hydraulically actuated controls 17 and 18 but the vertical control is also under the control of a chain 15j secured to a clamp about the bearing housing between the chain drives 15a and 15f. The chain 15j is vertically adjustable through a shaft 15k and crank handle 15l which is passed through a threaded block 15m carried by a post 15n secured to the primary frame 13.

The angle of attack of the rotary cutter 15i is under the control of a turnbuckle 15o, one end of which is secured to the top of the chain housing 15a as at 15p and the other end of which is pivotally secured to a bracket 15q as at 15r.

DRIVE MEANS

The drive means is best seen in FIGURES 1 and 6 wherein the power take-off 12, of the tractor, drives chain 15f which through a shaft 15g drives a chain 15h within the chain casement 15a for driving the shaft 15u to which is secured for rotation therewith the rotary earth engaging cutter 15i. The rotary earth engaging cutter 15i is provided with earth scattering blade 15v for engaging and distributing through distribution spout 15e a large stream of earth on the principle of centrifugal earth throwing.

WINGED PLOW MEANS

As best seen in FIGURES 1 and 3, winged plow means 19 are secured in advance of the rotary earth cutter 15i which engages and scoops earth assisted by a rotary disc 16 for introducing same into the rotary earth cutter 15 and its distribultor 15e.

Located rearwardly of the chain vertical drive casement 15a and secured thereto are support members 20 which form the ground engaging leveling control means.

GROUND ENGAGING LEVELING CONTROL MEANS

Secured at the rear of the chain casement 15a are ground leveling support plates 20 to which are pivoted at 20a adjusting members 20b through which pass bolts 20c which may be secured in an arcuate quadrant 20d in the plate 20.

Located rearwardly of the support plate 20 is a plate 20e secured thereto through which passes a threaded bolt 20f having a lock nut 20g for bearing against and regulating the position of axle housing 20h on which are rotatably carried the ground engaging wheels 20i.

IN OPERATION

With the primary frame, secondary frame and rotary cutter already assembled as one unit, the primary frame 13 being pivotally connected to the rear of the tractor is hydraulically actuated by chain control 17 and 18. The power take-off of the tractor is then connected to the chain casement 15f. This supplies power for driving the rotary cutter 15 from the power take-off 12 of the tractor 10. The chain 13d is then lowered by the links 17 and 18 to place the rotary cutter and earth engaging plow disc 16 at proper elevation to regulate the depth of cut. The ground engaging wheels 20i are then set and vernier adjustments through handle 15l are made to attain the exact grade level that it is desired to cut. The turnbuckle 15o is then adjusted to regulate the angle of attack of the rotary cutter and the tractor is moved forward at which time the rotary disc 16 engages and loosens earth which because of the tractor motion will rearwardly deposit earth into the rotating blades of the rotary earth cutter 15 causing the earth to be thrown in a violent manner through the discharge spout 15e of the rotary cutter 15.

The depth of cut of the disc 16 is under the control of the wheel 16c, the elevation of which may be set as desired. The fact that the disc 16 extends laterally beyond the rear wheel 11 of the tractor 10 permits the tractor and cutter to operate right up to a drainage ditch without fear of the tractor falling into the ditch.

Although I have disclosed herein the best forms of the invention known to me at this time, I reserve the right to all such modifications and changes as may come within the scope of the following claims.

What is claimed is:

1. For use with a tractor having large rear traction wheels and power take-off, a terracing and grading device comprising a first frame adapted to be pivotally attached to the rear of the tractor and movable to a raised and lowered position, a second frame pivotally connected to said first frame and being elevatable relative thereto, a rotary earth engaging cutter carried by said second frame, a plow disc carried by said first frame and having its axis of rotation laterally offset with respect to said rotary earth cutter and being positioned in advance of said rotary cutter with its earth-engaging face positioned to extend laterally beyond the rear tractor wheel on one side and to overlap the intake of the rotary earth cutter, winged plow means lying between the axis of the rotary cutter and the plow disc and being carried by a static portion of said rotary cutter and extending forwardly of said rotary cutter and being rearward of said plow disc and elevating control means for regulating the said first and second frame relative to one another and to the ground being cut by said disc and cutter and drive means for rotating said earth cutter adapted to be connetced to the power take-off of said tractor.

2. A terracing and grading device as claimed in claim 1, further comprising ground engaging level control means carried by said second frame rearwardly of said rotary cutter.

3. A terracing and grading device as claimed in claim 1, further comprising leveling means carried by said first frame and in engagement with the earth in advance of the plow disc.

References Cited

UNITED STATES PATENTS

| | | | |
|---|---|---|---|
| 297,408 | 4/1884 | Jull | 37—21 |
| 379,441 | 3/1888 | Bergendahl | 37—21 |
| 1,215,792 | 2/1917 | Funcheon et al. | 37—111 XR |
| 1,732,892 | 10/1929 | Hinds | 37—157 XR |
| 2,542,474 | 2/1951 | Burchett | 37—92 |
| 2,830,515 | 4/1958 | Zayco | 172—108 XR |
| 2,974,735 | 3/1961 | Smith et al. | |
| 3,085,832 | 4/1963 | Guillemette | 37—21 XR |
| 3,261,117 | 7/1966 | Shoemaker et al | 37—92 |

FOREIGN PATENTS 567,137   10/1957   Italy.

ROBERT E. PULFREY, *Primary Examiner.*

CLIFFORD D. CROWDER, *Assistant Examiner.*

U.S. Cl. X.R.

172—108